W. S. TWICHELL.
DEVICE FOR MECHANICAL AID FOR HANDWRITING.
APPLICATION FILED APR. 1, 1908.
963,835.
Patented July 12, 1910.
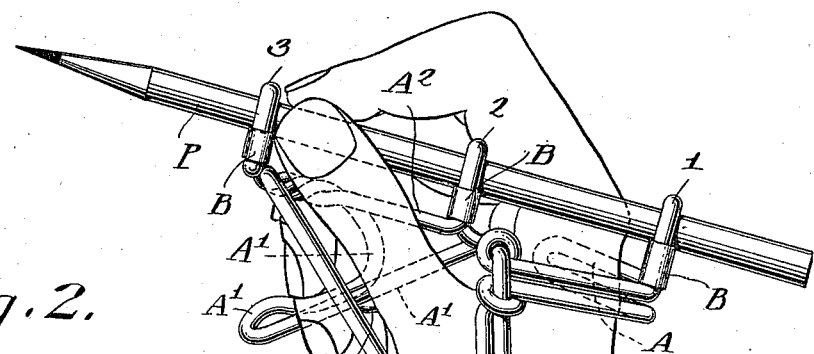
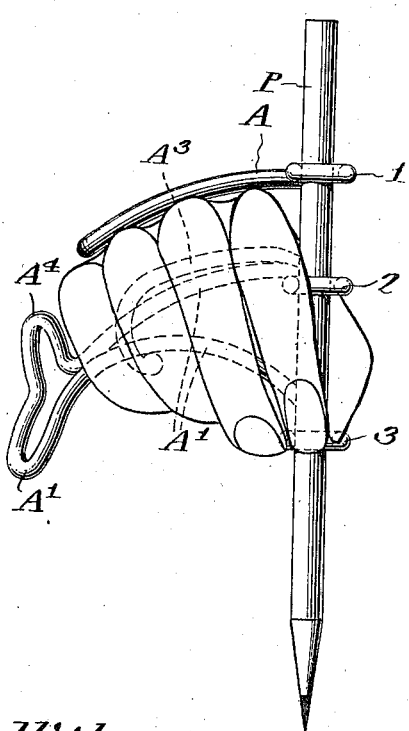

UNITED STATES PATENT OFFICE.

WILLIAM SEYMOUR TWICHELL, OF MIDLAND PARK, NEW JERSEY.

DEVICE FOR MECHANICAL AID FOR HANDWRITING.

963,835. Specification of Letters Patent. Patented July 12, 1910.

Application filed April 1, 1908. Serial No. 424,658.

*To all whom it may concern:*

Be it known that I, WILLIAM SEYMOUR TWICHELL, citizen of the United States, residing at Midland Park, in the county of Bergen and State of New Jersey, have invented certain new and useful Improvements in Devices for Mechanical Aid for Handwriting, of which the following is a specification, reference being had therein to the accompanying drawing.

The objects of my invention are to provide a device which will mechanically aid in the control of the fingers, hand, wrist, fore-arm and arm, or any of said members, in writing; to insure the correct position and the proper muscular movement thereof, in writing; for the proper training of the young and for assisting adults, and for the correction of existing evils or false methods in hand writing.

My invention may be utilized in writing with either a pencil or a pen and is capable of many modifications in construction, to control the movement of the members or motion employed in writing, as desired.

The finger movement may be prevented altogether if desired, which will insure what is called the muscular movement, or change the motive or power from the fingers to the arm. The lateral movement of the hand by bending the wrist may be prevented also, as well as the turning of the hand, which compels the writer to hold the hand in the correct position while writing and prevents the indolent, careless or indifferent pupils from acquiring the habit of holding the hand in those positions which are the cause of the evils or false methods in hand writing, that teachers now have to combat against.

In some of the modified forms of devices embodying my invention, if desired, the pen or pencil held by the fingers may be allowed to pass freely through the eyelets or portions of the devices that will serve as a guide for the pencil, thus permitting to some extent what is called the finger movement.

In all of the modified forms of construction which embody my invention, it is essential that some substantially arched or bow-shaped portion or portions of the device, pass under the palm of the hand forming a light and comfortable rest therefor, and adapted to prevent the hand from turning to either side, thus insuring a perfect position of the hand and pen or pencil while writing.

The principle of thus supporting the hand and pencil is illustrated in the accompanying drawings which form a part of this specification, in which drawings, similar reference-letters, and numerals, indicate like parts in the various figures.

The broad principle of harnessing the hand, wrist, or arm and the pen or pencil together for the purposes above mentioned, may be utilized in various modified forms of construction too numerous to be shown and described in this specification, and without departing from the scope and spirit of the invention.

In the accompanying drawings are shown some forms of devices which embody and illustrate the essential features of the invention.

Figure 1, illustrates the most extensive form substantially, of a device embodying the invention, the hand, wrist and fore-arm being harnessed to the pencil so as to insure a practical support for the hand and the pencil and to prevent absolutely any departure from the correct position and movement in writing; Fig. 2, is a front view of Fig. 1, the brace —A— above the hand being shown in solid lines and the arches under the palm of the hand forming a rest therefor, being shown in dotted lines; and showing more clearly than in Fig. 1, the end rest —A⁴— on the end of the arch —A¹—.

The invention in any of its various forms may be made in sizes to meet the demand and may be constructed of a single rigid piece or in adjustable folding parts for convenience in carrying, either with or without removing the pen or pencil from the holder. Portions of the device are covered with rubber tubing, leather or other similar material for the purpose of giving a finished appearance and for the comfort of the writer.

The members of the eyes or eyelets may be varied without departing from the essential spirit of the invention, and the lower end of the device which forms a rest for the hand, may be formed so as to offer little resistance to the movement of the arm in the proper muscular movement.

I do not wish to limit myself to the material used in the construction of my device, while I prefer to construct it of wire, either round or flat, in whole or in part. The portions of the device forming a rest for the hand may be of more or less bulk and instead of being made of wire, may consist of hard rubber or celluloid. Two or more parts of the device may be linked together by eyelets or folding joints, without departing from the scope of my invention.

In Fig. 1, of the drawings, the pencil —P—, is held rigidly in three eyelets—1, 2, and 3, formed by bent portions of the device, rubber bands, —B—, being employed to hold the pen or pencil in the position desired. The lower eyelet —3—, forms a rest for the fingers and thumb of the writer. The palm of the hand resting on the bridge or arch formed by the parts —$A^1$—, —$A^2$—, and upturned portion of —$A^4$—, which forms a rest for the side of the hand. —$A^3$— is a swinging brace adapted to pass over and around the wrist, and —A— is a spring-arm which passes over the top of the hand to hold the hand snugly, close to the supporting arch under the palm. The main stem of the device in this figure is composed of the parts —S— and —$S^1$—, which ends in an extended portion —$L^1$—, adapted to rest against the fore-arm, —L. The brace portion —$S^2$—, connects the part —$A^2$—, rigidly near eyelet —3—, with the eyelet on the main stem —S— and —$S^1$—.

Fig. 2 clearly illustrates the correct position of the hand which is insured absolutely by the use of my device.

The use of this invention will cure as well as prevent writers' cramp, and enable a person to write who has been unable to write for years by reason of palsy, or kindred troubles. For the hand that is weak or needs more support than others, the palm rest may be made to consist of a ball-shaped cage if necessary, or of a shell or of a solid support.

There are a very few and exceptional cases in which the harnessing of the pen or pencil to the hand is not essentially necessary in order to train the hand of the writer to write according to the up-to-date and improved methods in a short space of time.

With this description of my invention, what I claim is:—

1. In a device for mechanical aid in hand writing, the combination with a holder for pen or pencil, of a support for said holder, a rest for the hand, a brace passing over the hand, a brace extending from said support and hand rest along the wrist and fore-arm, and another brace adapted to pass over the wrist, all connected, constructed and arranged, substantially as set forth.

2. A mechanical device for controlling the position of a pen or pencil and the movements to be imparted thereto by the hand, wrist, and fore-arm, consisting of a series of braces constituting a holder for a pen or pencil, a support for said holder, a rest for the hand, and means connecting said braces so as to prevent the independent movement of the fingers, hand and wrist, substantially as set forth.

In testimony whereof I affix my signature in presence of two witnesses.

WILLIAM SEYMOUR TWICHELL.

Witnesses:
GERTRUDE MAYBEE,
JOHN F. KERR.